US00RE46443E

(19) United States
(12) Reissued Patent
Terrell

(10) Patent Number: US RE46,443 E
(45) Date of Reissued Patent: Jun. 20, 2017

(54) FLASH FIRE AND CHEMICAL RESISTANT FABRIC AND GARMENTS

(71) Applicant: Kappler, Inc., Guntersville, AL (US)

(72) Inventor: Adam J. Terrell, Horton, AL (US)

(73) Assignee: KAPPLER, INC., Guntersville, AL (US)

(21) Appl. No.: 14/253,685

(22) Filed: Apr. 15, 2014

Related U.S. Patent Documents

Reissue of:
(64) Patent No.: 8,156,576
Issued: Apr. 17, 2012
Appl. No.: 12/506,888
Filed: Jul. 21, 2009

U.S. Applications:
(60) Provisional application No. 61/135,457, filed on Jul. 21, 2008.

(51) Int. Cl.

| | |
|---|---|
| ***A62D 5/00*** | (2006.01) |
| ***A41D 27/02*** | (2006.01) |
| ***A41D 31/02*** | (2006.01) |
| ***B32B 15/14*** | (2006.01) |
| ***A41D 31/00*** | (2006.01) |
| ***A62B 17/00*** | (2006.01) |
| ***B32B 27/12*** | (2006.01) |

(52) U.S. Cl.
CPC ..... *B32B 15/14* (2013.01); *A41D 31/0027* (2013.01); *A62B 17/006* (2013.01); *A62D 5/00* (2013.01); *B32B 27/12* (2013.01); *Y10T 442/2631* (2015.04)

(58) Field of Classification Search
CPC .... A41D 31/0027; A62D 5/00; A62B 17/006; B32B 15/14; B32B 27/12
USPC ..... 428/920, 921; 442/152, 164, 172, 131, 442/132, 136, 138, 414; 2/458, 69, 81, 2/82, 272, 275
See application file for complete search history.

(56) References Cited

U.S. PATENT DOCUMENTS

| | | | | | |
|---|---|---|---|---|---|
| 2,300,503 | A | * | 11/1942 | Hamister et al. | 428/368 |
| 4,058,643 | A | | 11/1977 | Marshall et al. | |
| 4,670,073 | A | * | 6/1987 | Langley | 156/73.1 |
| 4,683,593 | A | * | 8/1987 | Langley | 2/82 |
| 4,792,480 | A | | 12/1988 | Freund et al. | |
| 4,833,010 | A | * | 5/1989 | Langley | 442/396 |
| 5,149,518 | A | * | 9/1992 | Mercuri et al. | 423/448 |
| 5,169,697 | A | * | 12/1992 | Langley et al. | 428/57 |
| 5,409,761 | A | * | 4/1995 | Langley | 428/198 |

(Continued)

FOREIGN PATENT DOCUMENTS

| | | | | |
|---|---|---|---|---|
| WO | WO2006102592 | * | 9/2006 | B32B 15/08 |

OTHER PUBLICATIONS

International Preliminary Report on Patentability and Written Opinion of the International Search Authority for International Application No. PCT/US2010/030261 dated Oct. 11, 2011; 13 pages.

*Primary Examiner* — Norca L Torres Velazquez
(74) *Attorney, Agent, or Firm* — Moore & Van Allen PLLC; Henry B. Ward, III

(57) ABSTRACT

A flash fire and chemical barrier composite fabric, comprising a flame resistant fibrous basic layer; a radiant heat and chemical permeation barrier, the barrier including a metalized polymeric chemical permeation resistant layer film; and a clear heat sealable outer film layer overlying the radiant barrier and forming a heat sealable outer surface of the composite fabric.

21 Claims, 1 Drawing Sheet

(56) References Cited

U.S. PATENT DOCUMENTS

| | | | | |
|---|---|---|---|---|
| 5,560,974 | A * | 10/1996 | Langley | 428/198 |
| 5,765,332 | A * | 6/1998 | Landin et al. | 52/396.01 |
| 5,869,193 | A * | 2/1999 | Langley | 428/520 |
| 5,948,708 | A | 9/1999 | Langley | 442/131 |
| 5,974,750 | A * | 11/1999 | Landin et al. | 52/396.01 |
| 6,048,805 | A * | 4/2000 | Gottfried | 442/138 |
| 6,325,127 | B1 * | 12/2001 | Waldrop | 156/510 |
| 7,157,388 | B2 * | 1/2007 | Langley et al. | 442/76 |
| 7,196,023 | B2 * | 3/2007 | Langley et al. | 442/131 |
| 7,484,275 | B2 * | 2/2009 | Carroll et al. | 27/28 |
| 7,501,357 | B2 * | 3/2009 | Carroll et al. | 442/131 |
| 8,156,576 | B1 | 4/2012 | Terrell | |
| 2001/0051481 | A1 * | 12/2001 | Carroll | 442/71 |
| 2003/0082972 | A1 * | 5/2003 | Monfalcone et al. | 442/138 |
| 2003/0126673 | A1 * | 7/2003 | Yardley | 2/272 |
| 2004/0006815 | A1 * | 1/2004 | Carroll et al. | 2/457 |
| 2004/0063371 | A1 | 4/2004 | Cox et al. | |
| 2004/0116022 | A1 * | 6/2004 | Langley et al. | 442/289 |
| 2004/0127621 | A1 * | 7/2004 | Drzal et al. | 524/424 |
| 2005/0014433 | A1 * | 1/2005 | Langley et al. | 442/76 |
| 2005/0191918 | A1 * | 9/2005 | Langley et al. | 442/59 |
| 2005/0255771 | A1 | 11/2005 | Chetty et al. | |
| 2006/0143767 | A1 | 7/2006 | Yang et al. | |
| 2006/0147698 | A1 * | 7/2006 | Carroll et al. | 428/316.6 |
| 2006/0160453 | A1 | 7/2006 | Suh | |
| 2006/0241237 | A1 * | 10/2006 | Drzal et al. | 524/495 |
| 2007/0094763 | A1 * | 5/2007 | Silver | 2/69 |
| 2007/0246208 | A1 * | 10/2007 | Tsukamoto | 165/185 |
| 2007/0264893 | A1 | 11/2007 | Mikaelian | |
| 2009/0118562 | A1 * | 5/2009 | Cole et al. | 588/313 |
| 2010/0140792 | A1 * | 6/2010 | Haddon et al. | 257/713 |

* cited by examiner

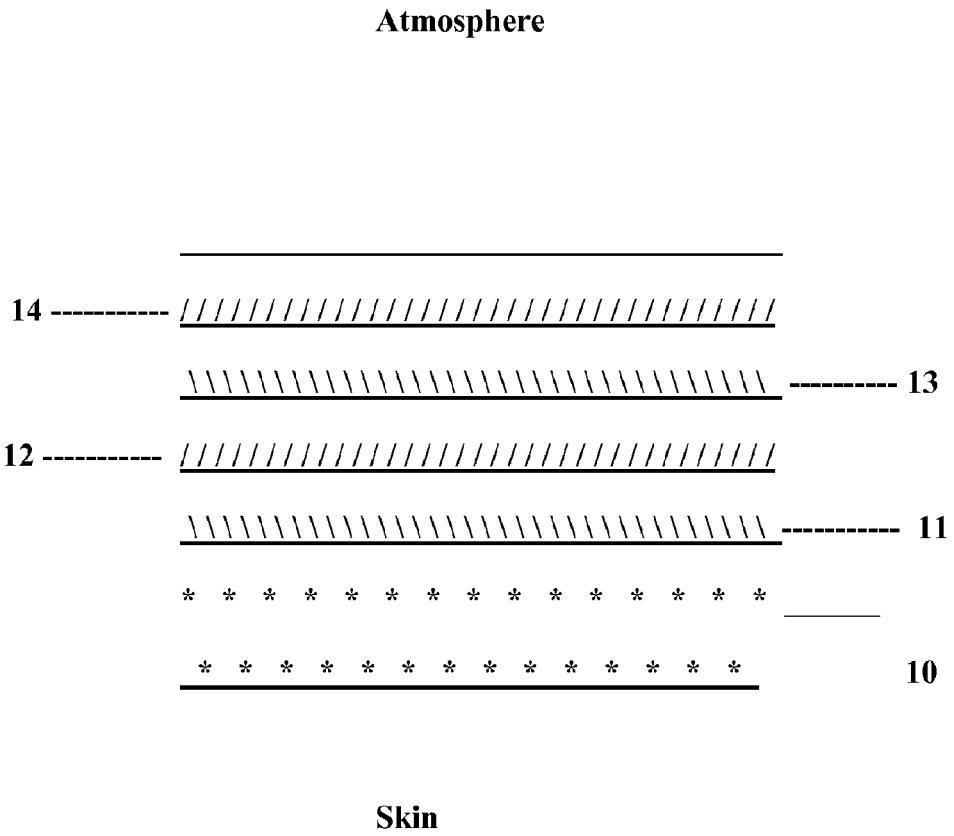
Atmosphere
14
13
12
11
10
Skin

FLASH FIRE AND CHEMICAL RESISTANT FABRIC AND GARMENTS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

PRIORITY INFORMATION

This application claims benefit to U.S. Patent Application No. 61/135,457, filed Jul. 21, 2008, the contents of which are incorporated herein by reference in their entirety.

FIELD OF THE INVENTION

The present invention relates to chemical protective clothing and the fabrics used therein. More specifically the present invention relates to chemical protective composite fabrics that also have flash fire resistance.

BACKGROUND OF THE INVENTION

Over the last few decades the choices of chemical protective clothing and ensembles available to hazardous materials clean up responders and plant workers have expanded significantly. As awareness of the hazards associated with dangerous and toxic chemicals in the liquid and or vapor forms increased, the chemical protective fabrics began to transition from rubber or PVC based fabrics to the more chemical permeation resistant film based fabrics.

ASTM International (ASTM), originally known as the American Society for Testing and Materials, is an international standards organization that develops and publishes voluntary consensus technical standards for a wide range of materials, products, systems, and services. In 1977 the ASTM formed the F23 committee on protective clothing. This committee has issued numerous test standards that have impacted the development of chemical protective clothing. One such standard was ASTM F739 which standardized how chemical permeation through protective fabrics is measured. This standard, which measures chemical migration through the fabric on a molecular level, highlighted the differences between traditional rubber products and newer barrier films. Another standard, ASTM F1001 established a chemical test battery consisting of 15 liquid chemicals and 6 gases representing a broad base of chemical families. If one chooses to document to this standard, all chemicals must be tested and reported. This again highlighted the advantage of high barrier films over the then traditional elastomeric fabrics.

One of the earliest film based fabrics to be developed was Saranex 23 laminated to Tyvek. This thin material offered considerable chemical protection compared to elastomeric products and solved the difficult problem of garment decontamination since this product was designed to be disposed of after use. U.S. Pat. No. 4,833.010 issued in 1989 describes a material that is heat sealable and exhibited greater than 8 hours permeation resistance to all of the ASTM F1001 chemicals. This material was used to fabricate gas tight suits offering the highest level of protection while still being designed for disposal after exposure to chemicals.

In 1986 the National Fire Protection Association (NFPA) established the subcommittee on Hazardous Materials Protective Clothing and Equipment. The first standard issued by this subcommittee was NFPA 1991 issued in 1990. This standard specified performance requirements for a gas tight level A suit that included chemical, physical, and flammability requirements. The film based products up until then offered excellent resistance to chemicals but readily burned and or melted when exposed to flame. To overcome this obstacle, the standard allowed for the wearing of a secondary outer cover typically made from a reflective metalized flame retardant (FR) fabric. The single skin standalone suits to meet the requirements of NFPA 1991 were typically made of composites of fluoropolymers that were expensive and difficult to manufacture. Additionally, these garments offer limited radiant heat resistance as they do not have a reflective surface.

Several attempts have been made at producing a single skin standalone material that offers both chemical and flash fire resistance. U.S. Pat. No. 4,792,480 describes a fabric that contains a reflective layer, a chemical layer, and a fabric substrate. The reflective outer surface is covered with a heat sealable layer of flame retardant film that is radiant heat transparent and light transparent thermoplastic film There is an inherent problem with making a clear transparent thermoplastic film flame retardant. When flame retardant additives are introduced into the film, the result is marginal FR performance and the film becomes milky or cloudy significantly reducing the ability of the reflective surface beneath it to reflect the radiant heat load. If a non flame retardant clear heat sealable film is used, it will burn off of the surface of the composite when subjected to a vertical flame. There has been no known product in the market based on the '480 patent.

U.S. Pat. No. 5,948,708 describes a fabric containing a reflective outer surface, a flame retardant fiber substrate, and a series of coextruded composite polymer barrier layers on the inner surface next to the wearer's skin. While this fabric provides flame and chemical protection, it is only heat sealable on the inside surface. This means that the seams of a garment made from this composite can only be heat sealed on the inside of the garment next to the skin. Typically the outer seams on the reflective surface are covered with a clear FEP pressure sensitive tape. The clear FEP pressure sensitive tape can be easily removed or abraded from the metalized outer surface of the garment through usage. While the wearer may be protected by the inner seams, undesirable contamination of the fabric substrate could occur through compromised outer seams.

US Publication US2004/0063371A1 describes a spunlaced flame retardant nonwoven fabric laminated to a halogenated flame resistant polymeric film This laminate offers limited chemical resistance and little or no radiant heat resistance.

US Publication US2005/0255771A1 describes a chemical and flash fire protective fabric comprising a flame retardant fabric inner surface, a chemical barrier layer, and a flame retardant outer polymer layer. The seams formed by the outer flame retardant outer layer are heat sealable. The disadvantage of this fabric is that it does not contain a reflective layer to block the radiant heat load.

SUMMARY OF THE INVENTION

An object of this invention is to provide a single fabric material that will provide chemical protection and flash fire protection for use in constructing garments to protect hazardous materials response personnel and chemical plant workers.

It is a further object to provide radiant heat protection through the utilization of a reflective chemical barrier layer.

Yet another object of this invention is to provide for a heat sealable surface layer over the reflective chemical barrier.

One embodiment of the present invention is a fabric comprised of a multilayer composite consisting of a flame retardant fabric, a chemical barrier layer with a reflective surface, and a clear thermoplastic outer layer that is heat sealable by the application of heat and pressure or through the use of thermoplastic strips of seam sealing tapes.

The fabric preferably passes flammability when tested per ASTM F1358 and/or ASTM D6413.

In other embodiments, the fabric creates a flash fire barrier wherein said flash fire is in the ambient atmosphere exposes the radiant barrier means and the fabric providing an interior surface temperature of less than about 275 degrees Fahrenheit.

Another embodiment of the use of a clear non flame resistant heat sealable thermoplastic layer of the present invention over a reflective barrier layer. Without being bound by theory or mechanism, this is made possible by the use of a thermal expanding adhesive layer dispersed between the flame retardant fiber and a metalized chemical barrier layer. This thermal expanding adhesive layer prevents ignition of the outer clear thermoplastic layer when exposed to flash fire. In one embodiment, the sealable outermost surface of the outer film layer can be a clear polyurethane film laminated to the metalized barrier film with a tie layer selected from a group consisting of EVA, EMA, and EAA.

Another embodiment of the present invention is a fabric useful for producing garments and ensembles that provide chemical protection, flash fire protection, and a reduction in radiant heat load that can be readily fabricated into various configurations with heat sealable outer seams.

Another embodiment of the present invention is a flash fire and chemical barrier composite fabric that has a flame resistant fibrous basic layer; a radiant heat and chemical permeation barrier, the barrier including a metalized chemical permeation resistant polymeric film; and a clear heat sealable outer film layer overlying the radiant barrier and forming a heat sealable outer surface of the composite fabric.

As examples the flame resistant fibers are chosen fiberglass, carbonized fibers, rayon, cotton, wool and aramid fibers, aromatic polyamide, polyester, or blends thereof. The chemical permeation barrier layer includes at least one component chosen from polyvinylidene chloride, ethylene-evinyl acetate, chlorinated polyethylene, polyethylene, low density polyethylene, linear low density polyethylene, high density polyethylene, nylon, polyvinyl alcohol, polyester, polytetrafluoroethylene, fluorinated ethylene propylene, propylene, polyvinyl chloride copolymer, acrylic, acrylonitrile, and ethylene vinyl alcohol. Additionally, the radiant heat and chemical permeation barrier can include a co-extruded polymeric chemical permeation resistant film to form a multilayer barrier. The metalized layer may be adhered to the top and/or bottom of the barrier. As an example, the radiant heat and chemical permeation barrier is a metalized polyester film Also the metalized polyester film may be between about 10 and 100 gauge in thickness.

Embodiments of the combined radiant heat and chemical barrier block 14 of the 15 liquid chemicals specified in ASTM F1001 for a period of 8 hours when tested per ASTM F739.

In a preferred embodiment, the combined radiant energy barrier and chemical resistant barrier is laminated to the flame retardant fabric by means of a flame resistant adhesive. As examples, the adhesive may comprise a hot melt polymer or thermal set polymer. Additionally, the flame resistant adhesive preferably contains expanding graphite.

Of course, other embodiments include protective garments made from the fabric of the present invention. The protective garments are preferably flash fire and chemical protective garments.

The garments may be sealed by hot air welded the exterior seams with a heat sealable chemical resistant tape. The garments preferably are vapor tight. That is, they preferably pass the ASTM F1052 vapor tight integrity test.

Other embodiments, aspects, and uses of the present invention, such as protective pallet or equipment covers, for example, would be evident to one of ordinary skill in the art when reviewing this disclosure.

BRIEF DESCRIPTION OF THE DRAWING

The drawing is a cross sectional view of an example of the present invention. The drawing shows a five-layer laminate material of the present invention.

DESCRIPTION OF EMBODIMENTS OF THE INVENTION

Referring to the drawing for a clearer understanding of the invention, it may be seen that five functional layers are bonded together to form the fabric. Of course, in other embodiments of the present invention, fewer or additional layers may be used.

The layer 10 closest to the skin (base layer) is a flame resistant material such as woven, nonwoven or knitted fabric formed of flame retardant fibers. This layer prevents flame impingement and forms the interior layer closest to the skin. Examples of suitable flame retardant fibers include flame retardant-treated cotton, flame retardant-treated rayon, and flame retardant-treated wool. Alternatively fabrics can be produced from inherently flame retardant fibers, non-limiting examples of which include fiberglass, carbon or carbonized fibers, aromatic polyamide fibers, such as Nomex® and Kevlar® from DuPont, flame resistant melamine fibers such as Basofil® from Basofil Fibers LLC, and polybenzimidazole fibers. Any combinations fibers are contemplated as well.

As used herein, "flame resistant" is defined in NFPA 2112 "Standard on Flame-Resistant Garments for Protection of Industrial Personnel Against Flash Fire" as "the property of a material whereby combustion is prevented, terminated, or inhibited following the application of a flaming or nonflaming source of ignition, with or without subsequent removal of the ignition source". Typically, flame resistance for the purpose of our application is measured by the criteria of ASTM F 1378 and ASTM D 6413.

As an example, the fibers disclosed in United States Application Number 2004/0063371, incorporated herein by reference, may be used in the base layer. Thus, an example of the base layer is nonwoven fabric. Examples of nonwoven fabrics include spunbond fabrics, resin bonded fabrics, thermal bonded fabrics, air-laid pulp fabrics, and stitchbonded fabrics. Additionally, the nonwoven fabric may be a spunlace fabric made from a combination of cellulosic and manmade fibers. Cellulosic fibers that may be used to form the spunlace fabric include woodpulp fibers, cotton fibers, regenerated cellulose fibers such as Rayon® (obtained from DuPont) or Lyocell® (obtained from DuPont), cellulose acetate fibers, cellulose triacetate fibers, jute, hemp and any bast, leaf, or stem fibers.

Manmade fibers that may be used to form the spunlace fabric include polyester, nylon, or acrylic fibers. When combining the manmade fibers and cellulosic fibers to form the spunlace fabric, it is convenient for the cellulosic and manmade fibers to be in the form of flat layers. Preferably, the celluosic fibers are in the form of sheets of paper and the manmade fibers are in the form of an air-laid web of staple fibers or a nonwoven sheet of substantially continuous filaments. The webs or sheets may be bonded or nonbonded. In this example of fibers, preferably, the weight ratio of the cellulosic fibers to manmade fibers ranges from 75:25 to 25:75, more preferably from 65:35 to 50:50.

Another example of fibers that can be used in the base layer are the "Fabric Layer" fibers disclosed in US Patent Application Number 2005.0255771, incorporated herein by reference.

Optionally, a fire retardant additive is applied to the base layer or the materials that comprise the base layer. Any well-known inorganic fire retardant additives can be used, including ammonium polyphosphates, ammonium dihydrogen phosphate, antimony trioxide, sodium antimonate, zinc borate, zirconium oxides, diammonium phosphate, sulfamic acid, salts of sulfamic acid, boric acid, salts of boric acid, and hydrated alumina.

Exemplary organic fire retardant additives that may be used include urea polyammonium phosphate, chlorinated paraffins, tetrabromobisphenol-A and oligomers thereof, decabromodiphenyl oxide, hexabromodiphenyl oxide, pentabromodiphenyl oxide, pentabromotoluene, pentabromoethylbenzene, hexabromobenzene, pentabromophenol, tribromophenol derivatives, perchloropentanecyclodecane, hexabromocyclodecone, tris(2,3-dibromopropyl1)isocyanurate, tetrabromobisphenol-S and derivatives thereof, 1,2-bis (2,3,4,5,6-pentabromophenoxy)ethane, 1,2-bis-(2,4,6-tribromophenoxy)ethane, brominated styrene oligomers, 2,2-bis-(4 (2,3-dibromopropyl)3,5-dibromophenoxy)propane, tetrachlorophthalic anhydride, and tetrabromophthalic anhydride.

Further, any combination of fire retardant additives, whether inorganic or organic, may be used. A preferred fire retardant additive is a phosphate, such as Spartan 880® sold by Spartan Flame Retardants. The fire retardant additive may be applied by any conventional method.

Layer 11 is a flame resistant adhesive layer. The adhesive layer includes a thermally stable or hot melt adhesive matrix layer and may also optionally include a particulate material which will expand in response to exposure to elevated temperature. The resulting noncombustible expanded char resists ignition and provides thermal insulating protection to the underlying substrate. The adhesive layer of the present invention may be at least one of flame retardant and intumescent in nature. An intumescent adhesive coating is one that bubbles and foams at high temperatures to form an insulating layer. Exemplary intumescent materials include, but are not limited to, melamine, pentaerythritol, fluorocarbon, graphite, bentonite, clay, phosphated or borated melamine, ammonium polyphosphate polyols and the like.

One useful laminating adhesive is available from Dooley Chemical Inc. in Chattanooga, Tenn. designated as product code DC TEX KSL. It has been found that this adhesive prevents ignition of both layers 12 and 13 when the composite is exposed to a vertical flame test.

Another example of a flame resistant adhesive layer of the present invention is the U.S. Pat. No. 4,058,643, which discloses adhesives which are flame retardant and intumescent in nature. Thus, an adhesive layer of the present invention such coatings contain at least four basic compounds including: an acid source, preferably phosphoric, a carbonaceous residue source, a blowing agent, a solvent. In some instances with respect to this example, it may be desirable to add additional compounds to the coating including resin binders which serve to improve the flexibility of the coating after it has been applied to the substrate film With respect to this example, in order for intumescence to occur upon exposure to high temperatures such as those generated by an ordinary flame, several distinct reactions take place in sequence. First, an acid salt, such as ammonium phosphate, decomposes to yield phosphoric acid which reacts with a highly carbonaceous polyol, including starch or erythritol, to form a clear melt which later becomes a char. Simultaneously, gases, such as ammonia, carbon dioxide, water vapor and hydrogen chloride, are evolved from blowing agents, such as melamine and chlorinated paraffin, which gives off bubbles as the liquid mass darkens and gelation occurs forming a multicellular structure. A binder, such as polyvinyl acetate or vinyl toluene-butadiene copolymer, may be employed to hold the intumescent fillers, and the solvent is added to control the viscosity. Organic or aqueous solvents may be employed. The acid source may be obtained from a plurality of materials including monoammonium phosphate, diammonium phosphate, ammonium polyphosphate, malamine phosphate, guanylurea phosphate, urea phosphate, ammonium sulfate and ammonium borate. The ammonium phosphates have been found particularly effective acid source materials for purposes of the present coating compositions.

The carbonaceous residue source materials employed in the present adhesive coating may include material such as sugars, e.g., glucose and maltose, polyhydric alcohols including erythritol, pentaerythritol, sorbitol and the like, and starches. In accordance with one specific embodiment of the present invention, it has been found that, in addition to the foregoing carbonaceous residue source materials, shellac provides an excellent foamed char residue when it is employed in the fire retardant adhesive coating compositions of the present invention. Shellac has been found to be a preferred carbonaceous residue source material in view of the many advantages it offers in the adhesive composition portion of the laminar structures of the present invention. Shellac exhibits an ability to maintain its adhesive properties with very high loadings of other additive compounds which may be present in the adhesive coating composition. Shellac does not drip or migrate from the flame source and, thereby, eliminates undesirable wicking of the plastic material, such as polyethylene, into the insulation batting leaving the flame retardant additives in the coating behind. Further, it has been found that shellac-based adhesives do not degrade or lose their holding power over extended periods of time which is an essential feature, for example in holding and maintaining insulation materials in a fixed location in building construction. Shellac-based adhesives are non-toxic, non-fuming and do not produce objectionable smoke when they are subjected to combustion temperatures. As hereinabove noted, the shellac compositions assist in the formation of hard char surface at the point of combustion and are easily adaptable for employment from either an aqueous or an organic solvent media.

Suitable blowing agents which may be incorporated into the intumescent coating compositions include melamine, guanidine, glycerine, urea and chlorinated paraffin, the latter having been found to be especially effective in the present coatings.

Expandable graphite particles are another example of an effective intumescent material of the present invention.

Layer 12 is a one side metalized or two side metalized film that serves the dual function of the radiant heat barrier and chemical resistance barrier. The film may be monolithic or coextruded to include one or more layers selected to impart chemical barrier properties to the film. The film can include polyvinylidene chloride, ethylenevinyl acetate, chlorinated polyethylene, polyethylene, low density polyethylene, linear low density polyethylene, high density polyethylene, nylon, polyvinyl alcohol, polyester, polytetrafluoroethylene, fluorinated ethylene propylene, propylene, polyvinyl chloride copolymer, acrylic, acrylonitrile, and ethylene vinyl alcohol. In one suitable embodiment the film may be a polyester film, such as a monoaxially or biaxially oriented polyethylene terephthalate (PET) film. One or both surfaces of the film includes a metal layer, formed for example by vacuum metallizing.

Layer 13 is a coextrusion of low density polyethylene (LDPE) and ethylene acrylic acid (EAA). The EAA component of the coextruded layer 13 adheres to the metalized surface of the polyester film layer 12. Layer 14 is clear low density polyethylene (LDPE) extrusion coated layer that serves the dual function of providing a heat sealable surface and protection for the metalized surface of the reflective barrier 12.

By "clear" is meant that the film does not contain substantial amounts of pigments or solid materials that would cause the film to appear cloudy or opaque, or otherwise substantially decrease the reflectivity of the metal coating layer. In other words, the layer is substantially transparent.

Test Methods

Chemical resistance of a fabric is typically measured by ASTM F739 (Test Method for Resistance of Protective Clothing Materials to Permeation of Liquids or Gases Under Conditions of Continuous Contact). Comparative radiant heat resistance was measured by an in house flash fire chamber using propane as a fuel. A thermocouple is placed inside of a closed tube of a diameter of 8 inches and height of 22 inches formed from the test fabric. The outside surfaces of the tube are exposed to a flash fire with a temperature of about 1200 to 1500 degrees F. that typically has a duration of about 5 to 7 seconds. This flashover testing is similar in concept to that specified in NFPA 1991 (Standard on Vapor-Protective Ensembles for Hazardous Material Emergencies) and NFPA 1992 (Standard on Liquid Splash-Protective Ensembles and Clothing for Hazardous Material Emergencies). If the sample tube survives the flash fire the temperature inside the tube is measured. This temperature should approximate the temperature that would occur inside the suit if the wearer encounters a chemical flash fire. Vertical flammability to an exposed flame is measured per ASTM F1358 (Effects of Flame Impingement on Materials Used in Protective Clothing Not Designed Primarily for Flame Resistance). An alternate method for measuring flammability is ASTM D6413 (Standard Test for Flame Resistance of Textiles (Vertical Test)).

EXAMPLES

The following represents embodiments of the present invention. As such, they are to be view as being exemplary of the present invention and are not to be view as limiting thereof.

Example 1

In a first lamination, a 40 gauge single sided metalized PET film was extrusion laminated to a 1.5 mil cast low density polyethylene film using a co-extruded tie layer of low density polyethylene (LDPE) and ethylene acrylic acid (EAA). The 55 approximate weight of the coextruded tie layer was 18 pounds per ream. This first lamination comprises the chemical and radiant heat barrier component of the composite. The first lamination component was subjected to permeation testing per ASTM F739. This data is presented in Table 1 and Table 2, below.

The first lamination component was then adhesively laminated to a 8.5 oz/yd$^2$ flame retardant treated cotton terrycloth fabric. A 10 oz/yd$^2$ expanding graphite adhesive was used to accomplish this lamination. Physical properties are summarized in Table 4. The flash fire data in Table 3 for Example 1 indicates only a 16% rise in internal temperature as compared to the exposed metalized surface of the '708 teaching. It can be seen that this increase is very modest compared to fabrics of the other teachings that have heat sealable outer surfaces. Example 1 passed flammability when tested per ASTM F1358 and D6413.

Example 2

In a first lamination, a 40 gauge single sided metalized PET film was extrusion laminated to a 1.5 mil cast low density polyethylene film using a co-extruded tie layer of low density polyethylene (LDPE) and ethylene acrylic acid (EAA). The approximate weight of the coextruded tie layer was 18 pounds per ream. This first lamination comprises the chemical and radiant heat barrier component of the composite. The first lamination was then adhesively laminated to a 5 oz/yd$^2$ nonwoven fabric of Basofil fibers. A 10 oz/yd$^2$ expanding graphite adhesive was used to accomplish this lamination. Physical properties are summarized in Table 4.

Example 2 passed flammability when tested per ASTM F1358 and D6413.

Example 3

In a first lamination, a 40 gauge single sided metalized PET film was extrusion laminated to a 1.5 mil cast low density polyethylene film using a co-extruded tie layer of low density polyethylene (LDPE) and ethylene acrylic acid (EAA). The approximate weight of the coextruded tie layer was 18 pounds per ream. This first lamination comprises the chemical and radiant heat barrier component of the composite. The first lamination component was then adhesively laminated to a 10 oz/yd$^2$ flame retardant treated cotton terry cloth fabric. A 13 oz/yd$^2$ expanding graphite adhesive was used to accomplish this lamination. Physical properties are summarized in Table 4.

Example 3 passed flammability when tested per ASTM F1358 and D6413.

Example 4

In a first lamination, a 40 gauge single sided metalized PET film was extrusion laminated to a 1.5 mil cast low density polyethylene film using a co-extruded tie layer of low density polyethylene (LDPE) and ethylene acrylic acid (EAA). The approximate weight of the coextruded tie layer was 18 pounds per ream. This first lamination comprises the chemical and radiant heat barrier component of the composite. The first lamination was then adhesively laminated to a 6.5 oz/yd$^2$ flame retardant cotton terry cloth. A 6 oz/yd$^2$ expanding graphite adhesive was used to accomplish this lamination. Physical properties are summarized in Table 4.

Example 4 passed flammability when tested per ASTM F1358 and D6413.

Example 5

In a first lamination, a 40 gauge single sided metalized PET film was extrusion laminated to a 1.5 mil cast low density polyethylene film using a co-extruded tie layer of low density polyethylene (LDPE) and ethylene acrylic acid (EAA). The approximate weight of the coextruded tie layer was 18 pounds per ream. This first lamination comprises the chemical and radiant heat barrier component of the composite. The first lamination was then adhesively laminated to a 3.8 oz/yd$^2$ flame retardant cotton polyester nonwoven cloth. A 7 oz/yd$^2$ expanding graphite adhesive was used to accomplish this lamination. Physical properties are summarized in Table 4. Example 5 passed flammability testing per ASTM D6413 and ASTM F1358.

Example 6

In a first lamination, a 40 gauge single sided metalized PET film was extrusion laminated to a 1.5 mil cast low density polyethylene film using a co-extruded tie layer of low density polyethylene (LDPE) and ethylene acrylic acid (EAA). The approximate weight of the coextruded tie layer was 18 pounds per ream. This first lamination comprises the chemical and radiant heat barrier component of the composite. The first lamination was then adhesively laminated to a 3.8 oz/yd$^2$ flame retardant cotton polyester nonwoven cloth. A 9.6 oz/yd$^2$ expanding graphite hot melt adhesive was used to accomplish this lamination. Physical properties are summarized in Table 4. Example 6 passed flammability testing per ASTM D6413 and ASTM F1358.

Example 7

In a first lamination, a 40 gauge single sided metalized PET film was extrusion laminated to a 1.5 mil cast low density polyethylene film using a co-extruded tie layer of low density polyethylene (LDPE) and ethylene acrylic acid (EAA). The approximate weight of the coextruded tie layer was 18 pounds per ream. This first lamination comprises the chemical and radiant heat barrier component of the composite. The first lamination was then adhesively laminated to a 3.8 oz/yd$^2$ flame retardant cotton polyester nonwoven cloth using a 7 oz/yd$^2$ expanding graphite adhesive. A second chemical barrier coextruded film was laminated to the back side of the nonwoven cloth using a flame retardant hot melt adhesive. The co-extruded film was 2 mils thick and consisted of LLDPE outermost layer and multiple inner barriers of nylon and LLDPE. The resulting composite passed flammability testing per ASTM D6413 and ASTM F1358. Expanding graphite was not necessary in the flame retardant hot melt used to laminate the 2 mil co-extruded barrier film in order for the composite to pass flammability. Physical properties are summarized in Table 4.

TABLE 1

ASTM F1001 Chemical Test Battery

| CHEMICAL | NORMALIZED BREAKTHROUGH TIME (MINS) per ASTM F739 |
|---|---|
| Acetone | >480 |
| Acetonitrile | >480 |

TABLE 1-continued

ASTM F1001 Chemical Test Battery

| | NORMALIZED BREAKTHROUGH TIME (MINS) per ASTM F739 |
|---|---|
| Carbon Disulfide | >480 |
| Dichloromethane | 4 |
| Diethylamine | >480 |
| Dimethylformamide | >480 |
| Ethyl Acetate | >480 |
| n-Hexane | >480 |
| Methyl Alcohol | >480 |
| Nitrobenzene | >480 |
| Sodium Hydroxide 50% | >480 |
| Sulfuric Acid | >480 |
| Tetrachloroethylene | >480 |
| Tetrahydrofuran | >480 |
| Toluene | >480 |
| GASES | |
| Ammonia Gas | >480 |
| 1,3 Butadiene | N.T. |
| Chlorine Gas | >480 |
| Ethylene Oxide Gas | >480 |
| Hydrogen Chloride Gas | N.T. |
| Methyl Chloride Gas | N.T. |

TABLE 2

Additional Chemicals of Interest to Petrochemical Industry

| CHEMICAL | NORMALIZED BREAKTHROUGH TIME (MINS) |
|---|---|
| Acrylonitrile | >480 |
| Aniline | >480 |
| Benzene | >480 |
| Diesel Fuel | >480 |
| Diethylethanolamine | >480 |
| Dimethylamine | >480 |
| Ethylene Glycol | >480 |
| Gasoline | >480 |
| Hydrofluoric Acid 48% | >480 |
| Hydrogen Peroxide | >480 |
| Kerosene | >480 |
| O-Xylene | >480 |
| Octane | >480 |
| P erchlorethylene | >480 |
| Propylene Oxide | 286 |
| Sodium Methylate in Methanol | >480 |
| Tertary Butyl | >480 |
| Titanium Tetrachloride | >480 |

TABLE 3

Flash Fire Test Data

| Protective Fabric | Temperature F. | Temperature C. |
|---|---|---|
| Unprotected Thermocouple | 1200 | 648 |
| Chem. Resist. FR Fabric ('377 publication) | 930 | 499 |
| Aramid Fiber FR Fabric | 355 | 179 |
| Chem. Resist. FR Fabric ('577 publication) | 328 | 164 |
| Chem. Resist. FR Fabric ('708 patent) | 179 | 82 |
| Example 1 | 209 | 99 |

TABLE 4

| Trapezoid Tear ASTM D752 | | |
|---|---|---|
| Trapezoid Tear | Machine Direction (MD) | Cross Direction (XD) |
| Example 1 | 15.2 lbs. | 9.8 lbs. |
| Example 2 | 8.3 lbs. | 10.2 lbs. |
| Example 3 | 15.4 lbs. | 8.8 lbs. |
| Example 4 | 9.81 lbs. | 15.17 lbs. |
| Example 5 | 6.25 lbs. | 10.24 lbs. |
| Example 6 | 7.19 lbs. | 11.35 lbs. |
| Example 7 | 5.96 lbs. | 10.49 lbs. |

Since an embodiment of the present invention contains a heat sealable outer surface, it makes it possible to construct a vapor tight protective suit in addition to other traditional protective clothing designs. Vapor protective suits typically accommodate an SCBA (self contained breathing apparatus) and must pass the ASTM 1052 positive pressure test for vapor tight ensembles. They may also be classified as EPA Level A response suits.

As vapor protective suits are often designed for hazardous materials responses, it is desirable to have the broadest chemical protection possible since the initial response may involve an unidentified hazard. In an alternate embodiment, additional chemical protection may be achieved through the addition of one or more barrier films on the innermost side next to the skin. This barrier may be a heat sealable monolithic or co-extruded film. The layers may be selected from polyvinylidene chloride, ethylenevinyl acetate, chlorinated polyethylene, polyethylene, low density polyethylene, linear low density polyethylene, high density polyethylene, nylon, polyvinyl alcohol, polyester, polytetrafluoroethylene, fluorinated ethylene propylene, propylene, polyvinyl chloride copolymer, acrylic, acrylonitrile, and ethylene vinyl alcohol. A flame retardant is not necessary since this innermost layer is protected by the radiant reflective outer surface and the insulative properties of the expanding adhesive and the flame retardant substrate. This innermost film may be attached to the substrate by thermal, extrusion, or adhesive lamination.

The invention thus being described, it will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the Specification, including the Example, be considered as exemplary only, and not intended to limit the scope and spirit of the invention.

Unless otherwise indicated, all numbers expressing quantities of ingredients, properties such as reaction conditions, and so forth used herein are to be understood as being modified in all instances by the term "about." Accordingly, unless indicated to the contrary, the numerical parameters set forth in the herein are approximations that may vary depending upon the desired properties sought to be determined by the present invention.

Notwithstanding that the numerical ranges and parameters setting forth the broad scope of the invention are approximations, the numerical values set forth in the example sections are reported as precisely as possible. Any numerical value, however, inherently contain certain errors necessarily resulting from the standard deviation found in their respective testing measurements.

Throughout this application, various publications are referenced. All such publications, specifically including the ones listed below, are incorporated herein by reference in their entirety.

I claim:

1. A flash fire and chemical barrier composite fabric, comprising:

a flame resistant fibrous basic layer having a side configured to face the skin of a wearer and an opposing side, *the flame resistant fibrous basic layer comprising flame resistant fibers chosen from fiberglass, carbonized fibers, rayon, cotton, wool and aramid fibers, aromatic polyamide, polyester, or blends thereof, wherein the flame resistant fibrous basic layer is a woven, nonwoven, or knit*;

a radiant heat and chemical permeation barrier layer[, the] *bonded to the opposing side of the flame resistant fibrous basic layer, the radiant heat and chemical permeation* barrier [including] *comprising* a metalized chemical permeation resistant polymeric film[;], *comprising one or more layers of polyolefin, a tie layer, and a clear heat sealable outer film bonded to the tie layer; wherein the radiant heat and chemical permeation barrier layer is structured such that the clear heat sealable outer film is the outermost layer providing a heat sealable outer surface thereon*

[an intumescent material positioned between the radiant heat and chemical permeation barrier layer and the flame resistant fibrous basic layer; and a clear heat sealable outer film layer overlying the radiant barrier layer providing a heat sealable outer surface thereon].

[2. The composite fabric of claim 1, wherein the flame resistant fibers are chosen from fiberglass, carbonized fibers, rayon, cotton, wool and aramid fibers, aromatic polyamide, polyester, or blends thereof.]

3. The composite fabric of claim 1, wherein the radiant heat and chemical permeation barrier layer includes at least one component chosen from polyvinylidene chloride, ethylene vinyl acetate, chlorinated polyethylene, polyethylene, low density polyethylene, linear low density polyethylene, high density polyethylene, nylon, polyvinyl alcohol, polyester, polytetrafluoroethylene, fluorinated ethylene propylene, propylene, polyvinyl chloride copolymer, acrylic, acrylonitrile, and ethylene vinyl alcohol.

[4. The composite fabric of claim 3, wherein the radiant heat and chemical permeation barrier layer includes a co-extruded polymeric chemical permeation resistant film.]

[5. The composite fabric of claim 3, wherein the radiant heat and chemical permeation barrier layer is a mono-layer film with the metalized layer adhered to the top and/or bottom thereof.]

[6. The composite fabric of claim 4, wherein the radiant heat and chemical permeation barrier layer is a co-extruded multilayer film with the metalized layer adhered to the top and/or bottom thereof.]

[7. The composite fabric of claim 1, wherein the flame resistant fabric is a woven, nonwoven, or knit.]

8. The composite fabric of claim 1, wherein the sealable outermost surface of the outer film layer is an extruded layer of polyolefin chosen from LDPE, LLDPE, HDPE, EVA, EAA, and blends thereof.

9. The composite *fabric* of claim 1, wherein the sealable outermost surface of the outer film layer is a clear polyolefin film laminated to the metalized barrier film [with a] *and the* tie layer *is* selected from a group consisting of EVA, EMA, and EAA.

10. The composite *fabric* of claim 1, wherein sealable outermost surface of the outer film layer is a clear polyurethane film.

[11. The composite of claim 1, further comprising a flame resistant adhesive between the radiant heat and chemical permeation barrier layer and the flame resistant fibrous basic layer, wherein the flame resistant adhesive contains the intumescent.]

[12. The composite of claim 11, wherein the adhesive comprises a hot melt polymer.]

[13. The composite of claim 11, wherein the adhesive comprises a thermal set polymer.]

14. The composite *fabric* of claim 1, wherein the radiant heat and chemical permeation barrier layer blocks 14 of the 15 liquid chemicals specified in ASTM F1001 *99a* (*2006*) for a period of 8 hours when tested per ASTM F739 (*2007*).

15. The composite *fabric* of claim 1, wherein the [radiant heat and chemical permeation barrier layer] *metalized chemical permeation resistant polymeric film* is a metalized polyester film.

16. The composite *fabric* of claim 15, wherein the metalized polyester film is between about 10 and 100 gauge in thickness.

17. The composite *fabric* of claim 1, wherein the heat sealable outer layer is a polyolefin layer laminated to the metalized barrier film with a tie layer of EAA.

18. The composite *fabric* of claim 1, wherein the fabric is configured to pass ASTM F1358 (*2005*) flammability test.

19. The composite *fabric* of claim 1, wherein the fabric passes flammability when tested per ASTM D6413 (*2008*).

20. The composite *fabric* of claim 1, wherein the composite fabric provides a flash fire barrier when exposed to a flash fire, the composite fabric providing an interior surface temperature of less than about 275 degrees Fahrenheit.

21. A protective garment made from the fabric of claim 1.

22. The garment of claim 21, comprising exterior seams, wherein a heat sealable chemical resistant tape welds the exterior seams.

23. The garment of claim 22, configured to pass the ASTM F1052 *97* (*2002*) vapor tight integrity test.

[24. The composite of claim 1, further comprising at least one additional chemical barrier layer laminated to the skin facing side of the flame retardant fabric.]

[25. The composite of claim 24, wherein the additional layer is chosen from polyvinylidene chloride, ethylene vinyl acetate, chlorinated polyethylene, polyethylene, low density polyethylene, linear low density polyethylene, high density polyethylene, nylon, polyvinyl alcohol, polyester, metalized polyester, polytetrafluoroethylene, fluorinated ethylene propylene, propylene, polyvinyl chloride copolymer, acrylic, acrylonitrile, and ethylene vinyl alcohol.]

[26. The composite claim 25, wherein the additional layer is a co-extruded multi-layer.]

27. The composite *fabric* of claim [24] *1*, wherein the radiant heat and chemical permeation barrier layer is configured to hold out at least 17 of the 21 liquid and gaseous chemicals specified in ASTM F1001 *99a* (*2006*) for a period of 8 hours when tested per ASTM F739 (*2007*).

[28. A flash fire and chemical protective garment made from the fabric of claim 24.]

[29. A flash fire and chemical protective garment of claim 28, comprising exterior seams and interior seams welded with a heat sealable chemical resistant tape.]

[30. A flash fire and chemical protective garment of claim 28, the garment configured to pass ASTM F1052 vapor tight integrity test.]

31. A flash fire and chemical protective garment comprising a composite fabric, the composite fabric comprising:

*a chemical barrier layer comprising co-extruded linear low density polyethylene layers with multiple nylon layers, the chemical barrier layer having an outermost layer of linear low density polyethylene configured for facing the wearer;* a flame resistant fibrous basic layer having an inner surface [configured for contact with a wearer] *bonded to the chemical barrier layer*, and an outer surface, *the flame resistant fibrous basic layer comprising flame resistant fibers chosen from fiberglass, carbonized fibers, rayon, cotton, wool and aramid fibers, aromatic polyamide, polyester, or blends thereof, wherein the flame resistant fibrous basic layer is a woven, nonwoven, or knit*;

[a radiant heat and chemical permeation barrier, the barrier including a metalized chemical permeation resistant polymeric film;]

*a radiant heat and chemical permeation barrier layer bonded to the outer surface of the flame resistant fibrous basic layer, the radiant heat and chemical permeation barrier comprising a metalized chemical permeation resistant polymeric film comprising one or more layers of a polyolefin, a tie layer, and a clear heat sealable outer film bonded to the tie layer; wherein the radiant heat and chemical permeation barrier layer is structured such that the clear heat sealable outer film is the outermost layer providing a heat sealable outer surface thereon;*

[an adhesive layer between the outer surface of the flame resistant fibrous basic layer and the radiant heat and chemical permeation barrier, the adhesive layer comprising a protective amount of intumescent sufficient to expand upon absorbing radiant heat energy when exposed to a flash fire; and a clear heat sealable layer deposited over the outer surface of the metalized chemical permeation resistant polymeric film;]

wherein the [metalized chemical permeation resistant polymeric film] *radiant heat and chemical permeation barrier layer* is capable of reflecting a protective amount of radiant heat energy passing through the clear heat sealable layer.

32. A method of protecting a wearer when exposed to a chemical and a flash fire, the method comprising:

providing a flash fire and chemical protective garment, the garment comprising:

a flame resistant fibrous basic layer having an outer surface and an inner surface configured [for contact with] *to face* a wearer, *the flame resistant fibrous basic layer comprising flame resistant fibers chosen from fiberglass, carbonized fibers, rayon, cotton, wool and aramid fibers, aromatic polyamide, polyester, or blends thereof, wherein the flame resistant fibrous basic layer is a woven, nonwoven, or knit*;

[a radiant heat and chemical permeation barrier overlaying the outer surface of the flame resistant fibrous basic layer,] *a radiant heat and chemical permeation barrier layer bonded to the outer surface of the flame resistant fibrous basic layer, the radiant heat and chemical permeation barrier comprising a metalized chemical permeation resistant polymeric film comprising one or more layers of polyolefin, a tie layer, and a clear heat sealable outer film bonded to the tie layer; wherein the radiant heat and chemical permeation barrier layer is structured such that the clear heat sealable outer film*

*is the outermost layer providing a heat sealable outer surface thereon,* the [barrier including a metalized chemical permeation resistant polymeric film] *radiant heat and chemical permeation* configured to reflect an amount of radiant heat energy of a flash fire;

[an adhesive layer between the outer surface of the flame resistant fibrous basic layer and the radiant heat and chemical permeation barrier the adhesive layer comprising an intumescent; and a clear heat sealable layer deposited over the outer surface of the metalized chemical permeation resistant polymeric film]

*optionally, a second chemical barrier layer bonded to the inner surface of the flame resistant fibrous basic layer of the laminate, the chemical barrier layer comprising co-extruded linear low density polyethylene layers with multiple nylon layers, the second chemical barrier layer having an outmost layer of linear low density polyethylene configured to face the wearer; and* creating a flash fire barrier for the wearer upon exposure to a flash fire in the ambient atmosphere by [at least one of: expanding the intumescent of the adhesive after absorbing an amount of radiant heat energy from the flash fire; and/or] reflecting an amount radiant thermal heat from the flash fire off of the metalized chemical permeation resistant polymeric film.

33. The method of claim 32, wherein the flash fire and chemical protective garment provides, during exposure to a flash fire, chemical protection to the wearer in combination with at least two of:

[(i) expanding upon absorbing a protective amount of radiant heat energy from the flash fire;]

[(ii)] (*i*) reducing the internal temperature rise inside the garment;

[(ii) charring of the expanded intumescent and thermally insulating the wearer and/or reducing ignition of the fibrous basic layer;]

[(iv)] (*ii*) reducing or eliminating combustion of the clear heat sealable layer deposited over the outer surface of the metalized layer; and

[(v)] (*iii*) reflecting an amount of radiant thermal heat from the flash fire.

[34. The method of claim 32, wherein the intumescent is expanding graphite.]

[35. The composite of claim 1, wherein the intumescent material is expanding graphite.]

*36. A flash fire and chemical protective garment of claim 31, the garment configured to pass ASTM F1052 97 (2002) vapor tight integrity test.*

*37. A flash fire and chemical protective garment comprising a composite fabric, the composite fabric comprising:*

*a flame resistant fibrous basic layer having an inner surface bonded to the outer surface of a chemical barrier layer, the flame resistant fibrous basic layer consisting of flame resistant fibers chosen from fiberglass, carbonized fibers, rayon, cotton, wool and aramid fibers, aromatic polyamide, polyester, or blends thereof, wherein the flame resistant fibrous basic layer is a woven, nonwoven, or knit;*

*a radiant heat and chemical permeation barrier layer bonded to the outer surface of the flame resistant fibrous basic layer, the radiant heat and chemical permeation barrier consisting of a metalized chemical permeation resistant polymeric film with one or more layers of a polyolefin, a tie layer, and a clear heat sealable outer film bonded to the tie layer; wherein the radiant heat and chemical permeation barrier layer is structured such that the clear heat sealable outer film is the outermost layer providing a heat sealable outer surface thereon; and*

*optionally, a second chemical barrier layer bonded to the inner surface of the flame resistant fibrous basic layer, the chemical barrier layer consisting of co-extruded linear low density polyethylene layers with multiple nylon layers, the second chemical barrier layer having an outermost layer of linear low density polyethylene configured for facing the wearer;*

*wherein the radiant heat and chemical permeation barrier layer is capable of reflecting a protective amount of radiant heat energy passing through the clear heat sealable layer;*

*the garment configured to pass ASTM F1052 97 (2002) vapor tight integrity test.*

* * * * *